(12) United States Patent
Kim et al.

(10) Patent No.: US 9,713,872 B2
(45) Date of Patent: Jul. 25, 2017

(54) MULTI-INPUT REDUCTION GEAR HAVING INPUT/OUTPUT POSITION FEEDBACK

(71) Applicant: ROBOTIS CO., LTD., Seoul (KR)

(72) Inventors: Byoung Soo Kim, Seoul (KR); In Yong Ha, Seoul (KR); Jung Ho Lee, Gwangmyeong-si (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 15/038,480

(22) PCT Filed: Apr. 28, 2014

(86) PCT No.: PCT/KR2014/003740
§ 371 (c)(1),
(2) Date: May 23, 2016

(87) PCT Pub. No.: WO2015/167031
PCT Pub. Date: Nov. 5, 2015

(65) Prior Publication Data
US 2016/0303744 A1    Oct. 20, 2016

(30) Foreign Application Priority Data

Apr. 28, 2014 (KR) .......................... 10-2014-0050947

(51) Int. Cl.
*F16H 1/32* (2006.01)
*B25J 17/00* (2006.01)
*B25J 9/10* (2006.01)

(52) U.S. Cl.
CPC ............... *B25J 17/00* (2013.01); *B25J 9/102* (2013.01); *F16H 1/32* (2013.01); *F16H 1/321* (2013.01)

(58) Field of Classification Search
None
See application file for complete search history.

(56) References Cited

U.S. PATENT DOCUMENTS

2011/0089709 A1* 4/2011 Neeper .................... B25J 9/102
                                                        294/119.1
2012/0286629 A1* 11/2012 Johnson ..................... B25J 9/08
                                                        310/68 B (Continued)

FOREIGN PATENT DOCUMENTS

JP       2006-050710 A    2/2006
KR   10-2006-0101609 A    9/2006

(Continued)

OTHER PUBLICATIONS

International Search Report for PCT/KR2014/003740 mailed Jan. 26, 2015 from Korean Intellectual Property Office.

*Primary Examiner* — Edwin A Young
(74) *Attorney, Agent, or Firm* — Revolution IP, PLLC

(57) ABSTRACT

Disclosed is a multi-input reduction gear having an input/output position feedback, including: a reduction gear body including an input unit and an output unit; an output feedback unit which is detachably provided in the reduction gear body and detects a position of the output unit; an input mediating unit which is detachably provided in the reduction gear body, is connected to a shaft of a power source, and transmits power to the input unit; and an input feedback unit which is stacked between and coupled to the reduction gear body and the input mediating unit and detects a position of the input unit.

9 Claims, 8 Drawing Sheets

(56) References Cited

U.S. PATENT DOCUMENTS

2013/0238123 A1\* 9/2013 Mihara ................... B25J 9/102
                                                                              700/245
2014/0060223 A1    3/2014 Tanaka

FOREIGN PATENT DOCUMENTS

| KR | 10-2010-0000548 A | 1/2010 |
| KR | 10-2013-0045692 A | 5/2013 |

\* cited by examiner

MULTI-INPUT REDUCTION GEAR HAVING INPUT/OUTPUT POSITION FEEDBACK

CROSS REFERENCE TO PRIOR APPLICATIONS

This application is a National Stage Application of PCT International Patent Application No. PCT/KR2014/003740 filed on Apr. 28, 2014, under 35 U.S.C. §371, which claims priority to Korean Patent Application No. 10-2014-0050947 filed on Apr. 28, 2014, which are all hereby incorporated by reference in their entirety.

TECHNICAL FIELD

The present invention relates to a multi-input reduction gear having an input/output position feedback, and more particularly, to a multi-input reduction gear having an input/output position feedback so that an automatic device is easily made.

BACKGROUND ART

From industrial robots to humanoid robots, in various fields involving using robots, an actuator is generally used that has a speed reduction function for smooth joint movement.

Particularly, in robotics technology which has been developing rapidly recently, robotics mechanisms which have been conventionally applied only to industrial fields are being grafted to other fields, for example, a home cleaning robot, a programming educational robot, a robot toy, and an entertainment robot, etc.

In such robot technology, the actuator related to driving is a very important main component and includes a reduction gear as a main component.

Although there are various kinds of reduction gears, representative examples of the reduction gears may include a gear type reduction gear, a rolling ball type reduction gear, and a cycloid reduction gear, etc.

Here, the gear type reduction gear is the most used general reduction gear that uses an involute tooth form.

The rolling ball type reduction gear reduces speed by rolling a ball in a guide groove in a shape in which an epicycloid curve and a hypocycloid curve are facing each other.

The cycloid reduction gear generally obtains reduced speed by fixing a pin, eccentrically rotating a trochoid gear using an epicyclic gear and rotating only the trochoid gear using a pin hole and a pin disposed at the same angle in the trochoid.

Particularly, the cycloid reduction gear among the above described reduction gears is widely applied to a field for requiring a precise control because of a capability of realizing various reduction ratios and an advantage of high precision and a large speed reduction.

Meanwhile, FIG. 1 is a schematic view illustrating an automatic device to which a conventional reduction gear is applied, and FIG. 2 is a schematic view illustrating an output position feedback unit of the conventional reduction gear. Description will be done with reference to the drawings.

First, as illustrated in FIG. 1, an output position feedback unit (40) is additionally installed outside of a conventional reduction gear (20) in an automatic device to which the reduction gear (20) is applied, and the output position feedback unit (40) is linked to a reduction gear output unit (20b) by a power transmit unit (30) as a medium.

Furthermore, the output position feedback unit (40) and the reduction gear (20) are fixed to a body (50) of a robot, etc. by fixing parts (50a and 50b) as media.

In addition, a power source which transmits power to a reduction gear input unit (20a) mostly uses a motor (10) and is linked to the reduction gear input unit (20a) by a motor shaft (10a), and furthermore, the power source and the motor may also be linked to each other by various mechanical components such as a gear, a belt pulley, and a coupling.

In addition, as illustrated in FIG. 2, the conventional reduction gear (20) only supports a fixed type input/output method provided by a manufacturer because the output position feedback unit (40) is provided outside of the reduction gear 20 without a unit sensing an input/output position.

Accordingly, it is difficult to change the input method after the reduction gear (20) is manufactured, and since power transmitted by the reduction gear (20) cannot be controlled, and thus, information of an absolute output position and input/output displacement cannot be sensed and applied to a control of the automatic device.

In addition, since an integrated conventional reduction gear (20) is not adaptable to a driving unit having various driving types, there is a limitation to selecting an input driving unit, and thus, it is cumbersome to prepare an additional unit which connects the reduction gear (20) and the input driving unit.

Accordingly, since a structure of the reduction gear (20) becomes complex, maintenance cost such as processing cost and manufacturing cost is high, and since the entire volume of the reduction gear (20) becomes increased, there is a disadvantage in miniaturization of the reduction gear (20).

DISCLOSURE

Technical Problem

The present invention is directed to providing a multi-input reduction gear having an input/output position feedback so that an automatic device is easily made.

Technical Solution

One aspect of the present invention provides a multi-input reduction gear having an input/output position feedback including a reduction gear body including an input unit and an output unit, an output feedback unit which is detachably provided in the reduction gear body and detects a position of the output unit, an input mediating unit which is detachably provided in the reduction gear body, is connected to a shaft of a power source, and transmits power to the input unit, and an input feedback unit which is stacked between and coupled to the reduction gear body and the input mediating unit and detects a position of the input unit, wherein a mounting groove is provided in the reduction gear body in a direction toward the inside of the input unit such that the output feedback unit is detachable, and an output feedback unit coupling hole formed in the mounting groove and an input feedback unit coupling hole formed around the mounting groove are provided in the input unit.

The output feedback unit may be embedded in the input unit to be integrated with the reduction gear body.

The output feedback unit may include a body in a rectangular shape, an output position indicator which transmits a rotation angle to the output unit, and an output position detector which detects a position and displacement of the output position indicator.

Any one of magnetic, potentiometer, and optical incremental encoder methods may be used for detection of the output feedback unit.

Any one of the methods of the output feedback unit may be used for detection of the input feedback unit.

The input mediating unit may be provided in any one type of a shaft, a coupling hole, and a gear.

The input feedback unit may include a frame in which a through hole is formed, an input position indicator which is inserted into the through hole and transmits a rotation angle to the input unit, and an input position detector which detects a position and displacement of the input position indicator, wherein the input position indicator is provided with a hollow hole to be coupled to the input mediating unit, and one or more coupling holes are formed inside the hollow hole to fix the input mediating unit.

The frame may further include an entrance hole which communicates with the hollow hole such that a fixing member is inserted.

A cycloid type speed reduction unit may be provided between the input unit and the output unit.

Advantageous Effects

According to the embodiment of the present invention, because an input/output feedback unit and an input mediating unit included in a reduction gear is detachable, an input method for making an automatic device is easy, and because a stacked coupling structure is realized, a plurality of mechanical components can be selectively adopted.

In addition, since positions of an input unit and an output unit are fed back by the input/output feedback unit included in the reduction gear having a detachable coupling structure, there is an effect where more elaborate and accurate control becomes possible.

Effects of the present invention are not limited to above-described effects, it should be understood that all effects which may be inferred from the present invention described in the modes of the invention or claims are included thereto.

MODES OF THE INVENTION

Figure 1:
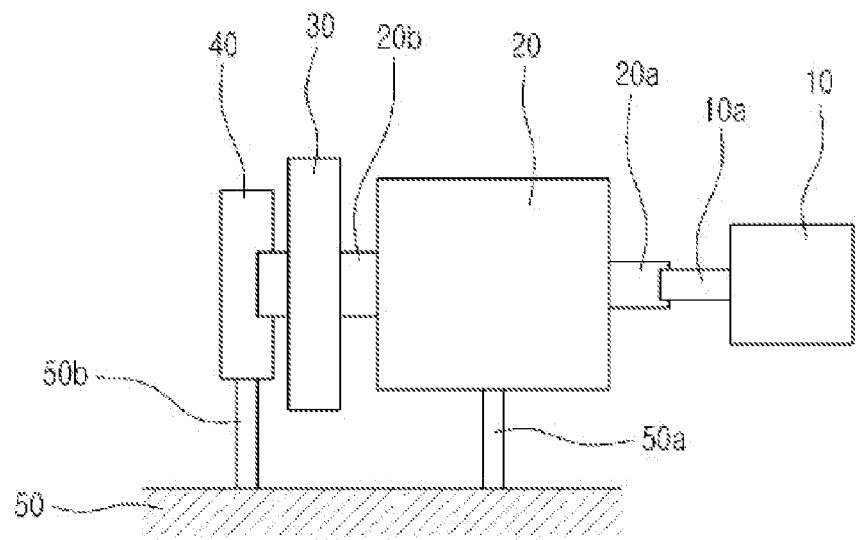
FIG. 1 is a schematic view illustrating an automatic device to which a conventional reduction gear is applied.
Figure 2:
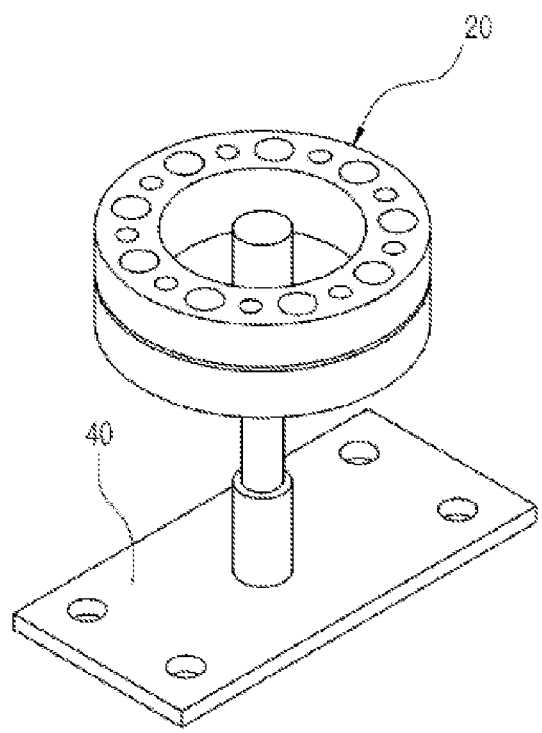
FIG. 2 is a schematic view illustrating an output position feedback unit of the conventional reduction gear.

Hereinafter, the present invention will be described in detail with reference to the accompanying drawings. However, embodiments of the present invention may be implemented in several different forms and are not limited to embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, it includes "directly connected" and "indirectly connected" via an intervening part. Also, when a certain part "includes" a certain component, other components are not excluded unless explicitly described otherwise, and other components may in fact be included.

Hereinafter, embodiments of the present invention will be described in detail with reference to accompanying drawings.

Figure 3:
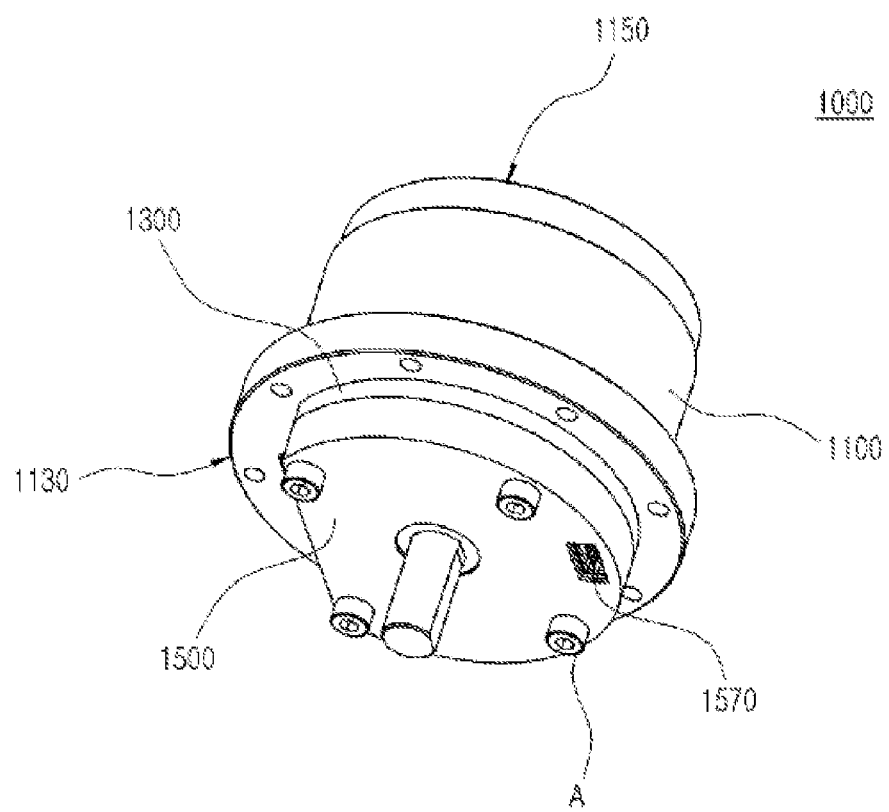
FIG. 3 is a view illustrating a multi-input reduction gear having an input/output position feedback according a first embodiment of the present invention.
Figure 4:
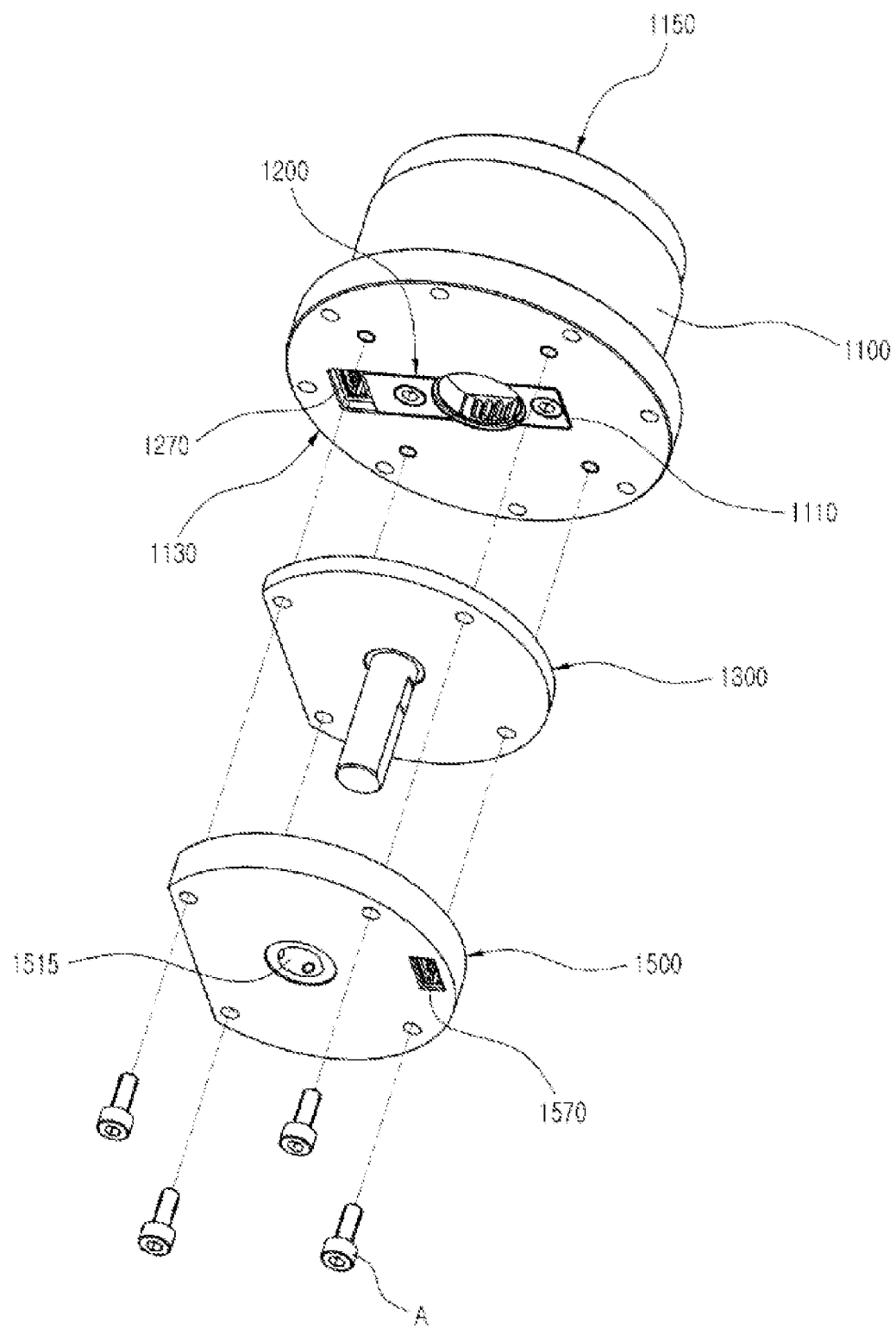
FIG. 4 is an exploded view illustrating the multi-input reduction gear shown in FIG. 3.

FIG. 3 is a view illustrating a multi-input reduction gear having an input/output position feedback according a first embodiment of the present invention, and FIG. 4 is an exploded view illustrating the multi-input reduction gear of the first embodiment shown in FIG. 3. The embodiment will be described with reference to the drawings.

As illustrated in FIGS. 3 and 4, a multi-input reduction gear 1000 according to the embodiment includes a reduction gear body 1100, an output feedback unit 1200, an input mediating unit 1300, and an input feedback unit 1500.

The reduction gear body 1100 includes an input unit 1130 and an output unit 1150, and is provided with a mounting groove 1110 in a direction toward inside of the input unit 1130 such that the output feedback unit 1200 may be attached and detached.

The output feedback unit 1200 is detachably provided on the reduction gear body 1100 and detects a position of the output unit 1150.

The input mediating unit 1300 is detachably provided on the reduction gear body 1100 and is connected to a shaft of a power source to transmit power to the input unit 1130.

The input feedback unit 1500 is stacked between and coupled to the reduction gear body 1100 and the input mediating unit 1300 and detects a position of the input unit 1130.

Meanwhile, when all components of the multi-input reduction gear 1000 according to the embodiment are correctly coupled, the input unit 1130 of the reduction gear body 1100, the output feedback unit 1200, the input mediating unit 1300, and the input feedback unit 1500 may be sequentially coupled by a coupling member as a medium.

Here, since the output terminal unit 1270 of the output feedback unit 1200 and the input terminal unit 1570 of the input feedback unit 1500 are exposed in a direction of the input unit 1130, connection to a wiring member for electrical connection is easy, and due to being easily and visually observed, a cause of a hardware error can be quickly checked.

In addition, components of a multi-input type according to the embodiment may be coupled to the input unit 1130 of the reduction gear body 1100 by a coupling member as a medium, for example, a screw, an hexagonal wrench, and the like.

Furthermore, for the purpose of loss prevention and convenient management of the coupling member, a protrusive shape is formed at one side of each of the output feedback unit 1200, the input mediating unit 1300, and the input feedback unit 1500, and a corresponding concave shape is provided at the other side of each thereof, and thus, detaching and attaching may be convenient.

However, in a process in which the input reduction gear 1000 converts a high speed low torque input transmitted from a power source, such as a motor, to a low speed high torque output, since components coupled to the reduction gear body 1100 may generate an undesirable phenomenon such as separation and detaching due to an influence of minute shaking, it is preferable that the coupling member be a screw and a hexagonal wrench.

Figure 5:
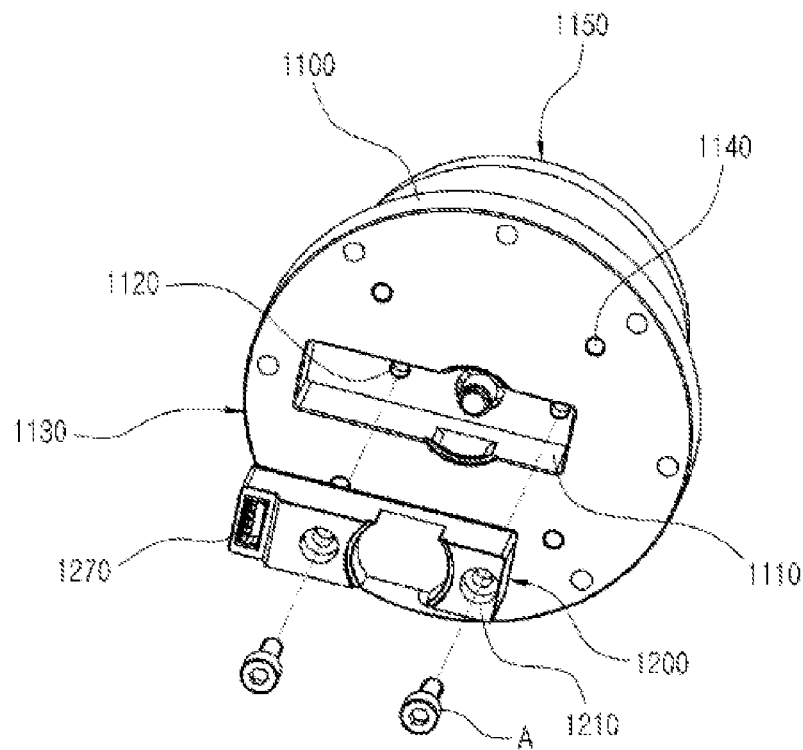
FIG. 5 is an exploded view illustrating a reduction gear body and an output feedback unit according to the embodiment of the present invention.
Figure 6:
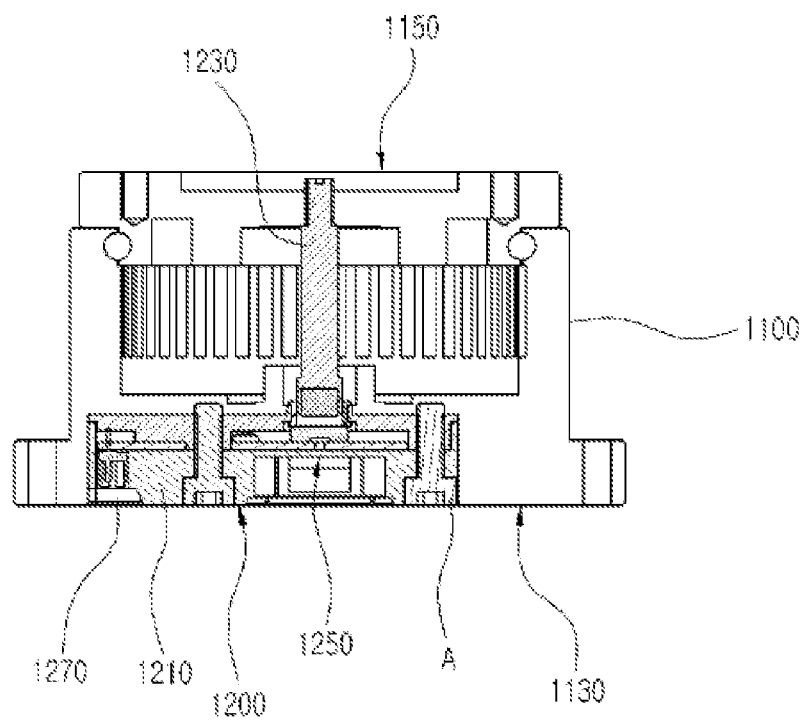
FIG. 6 is a side view illustrating the reduction gear body to which the output feedback unit is coupled.

FIG. 5 is an exploded view illustrating a reduction gear body and an output feedback unit according to the embodiment of the present invention, FIG. 6 is a side view illustrating the reduction gear body to which the output feedback unit is coupled, and the embodiment will be described with reference to the drawings.

As illustrated in FIG. 5, the reduction gear body 1100 includes the input unit 1130 and the output unit 1150, and a cycloid type speed reduction unit may be provided between the input unit 1130 and the output unit 1150, but it is not limited thereto. Such specific technology is not described in the present embodiment because of being sufficiently substitutable by a conventional technology.

An output feedback unit coupling hole 1120 formed in the mounting groove 1110 and an input feedback unit coupling hole 1140 formed around the mounting groove 1110 may be provided in the input unit 1130 of the reduction gear body 1100.

Accordingly, the output feedback unit 1200 may be accommodated in the input unit 1130 through the mounting groove 1110 and be detached by the coupling member.

In addition, the output feedback unit 1200 may be installed in the input unit 1130 to be integrated with the reduction gear body 1100, and the output terminal unit 1270 may also be exposed to the outside of the input unit 1130.

Meanwhile, the output feedback unit 1200 includes a body 1210, an output position indicator 1230, and an output position detector 1250.

That is, as illustrated in FIG. 6, the output feedback unit 1200 is provided such that the body 1210 is embedded in the mounting groove 1110 of the reduction gear body 1100 and the output position indicator 1230 is provided at the center of the reduction gear body 1100 to transmit a rotation angle to the output unit 1150.

The output position detector 1250 may be provided inside the body 1210 or be embedded in the mounting groove 1110 by being coupled to an external surface of the body 1210 so as to detect a position and displacement of the output position indicator 1230.

Here, the body 1210 of the output feedback unit 1200 may include a position detection sensor which detects a position of the output unit 1150, an output circuit which measures an electrical change detected by the position detection sensor, and an output terminal unit 1270 for applying a position of the output unit 1150.

In addition, a detecting method of the output feedback unit 1200 according to the embodiment is a magnetic flux detection method using a magnetics but is not limited thereto. The output feedback unit 1200 may also detect using any one of a potentiometer and an optical incremental encoder.

With a magnet mounted on the output position indicator 1230, the magnetic flux detecting method detects a flux or a change in flux of the output position detector 1250.

On the other hand, the potentiometer method measures a resistance which varies depending on an angle between a fixing part and a rotational part, wherein a connector is formed at an end of the output position indicator 1230 to connect to a rotator of the output position detector 1250, and the output position detector 1250 includes a fixing part fixed to the circuit and a rotational part coupled to the connector of the output position indicator 1230.

In addition, the optical incremental encoder method is a method in which a light receiver determines whether light emitted by a light generator passes through slits, wherein a rotational disk including the slits arranged with equidistant intervals (equiangular intervals) is mounted on the output position indicator 1230, and the output position detector 1250 includes the light generator and the light receiver.

At this point, when the output position indicator 1230 rotates, the output position detector 1250 outputs a position in a pulse form, and a relative (absolute) position is determined by the number of the measured pulses.

Figure 7:
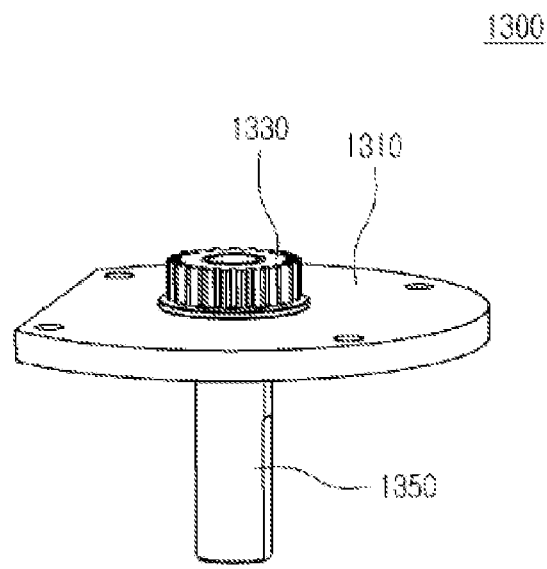
FIG. 7 is a view illustrating an input mediating unit to be coupled to the multi-input reduction gear according to the embodiment of the present invention.
Figure 8:
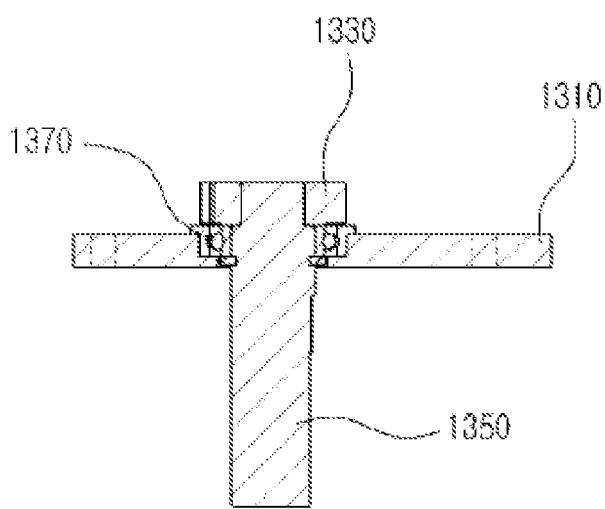
FIG. 8 is a cross-sectional view of the input mediating unit shown in FIG. 7.

FIG. 7 is a view illustrating an input mediating unit to be coupled to the multi-input reduction gear according to the embodiment of the present invention, FIG. 8 is a cross-sectional view of the input mediating unit shown in FIG. 7, and the embodiment will be described with reference to the drawings.

The input mediating unit 1300 illustrated in FIGS. 7 and 8 will be described with reference to the above-described FIGS. 3 and 4, and the multi-input reduction gear 1000 according to the embodiment includes the input mediating unit 1300 in a shaft type.

As illustrated in FIGS. 7 and 8, the input mediating unit 1300 in a shaft type according to the embodiment includes an adaptor frame 1310, a gear member 1330, a shaft member 1350, and a bearing member 1370.

The adaptor frame 1310 is provided to have a circular shape to be correspondingly coupled to the input unit 1130 of the reduction gear body 1100, the shaft member 1350 is provided to pass through the center of the adaptor frame 1310 to safely transmit a rotary power transmitted from the power source to the input unit 1130, and the gear member 1330 is provided at an end of the shaft member 1350 that passes through and formed protruding from the center of the adaptor.

In addition, the bearing member 1370 is provided between the adaptor frame 1310 and the gear member 1330 to tolerate an external force such as twisting, a vertical load, a horizontal load, and an impact due to driving rotary power.

Figure 9:
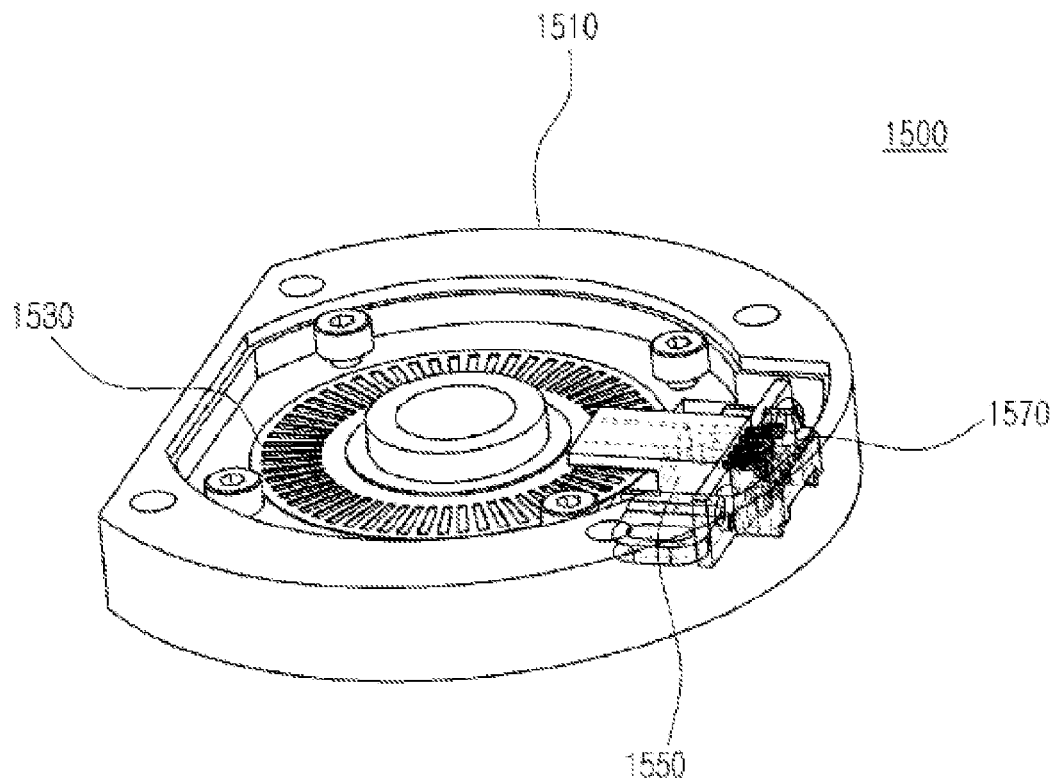
FIG. 9 is a schematic view illustrating the inside of an input feedback unit according to the embodiment of the present invention.
Figure 10:
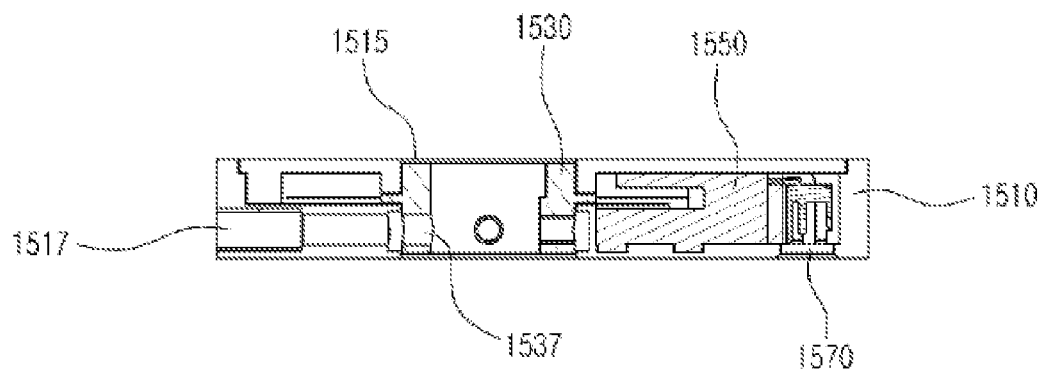
FIG. 10 is a cross-sectional view of the inside of the input feedback unit shown in FIG. 9.

FIG. 9 is a schematic view illustrating the inside of an input feedback unit according to the embodiment of the present invention, FIG. 10 is a cross-sectional view of the inside of the input feedback unit shown in FIG. 9, and the embodiment will be described with reference to the drawings.

As illustrated in FIGS. 9 and 10, the input feedback unit 1500 according to the embodiment includes a housing 1510, an input position indicator 1530, and an input position detector 1550.

The housing 1510 is provided in a circular shape in which a through hole 1515 is formed, the input position indicator 1530 is inserted into the through hole 1515 of the housing 1510 to be embedded inside the housing 1510 so as to transmit a rotation angle to the input unit 1130, and the input position detector 1550 is provided adjacent to the input position indicator 1530 to detect a position and displacement of the input position indicator 1530.

Here, the housing 1510 may include a position detection sensor which detects a position of the input unit 1130, an input circuit which measures an electrical change detected by the position detection sensor, and an input terminal unit 1570 for applying a position of the input unit 1130.

In addition, a hollow hole for coupling to the input mediating unit 1300 is provided in the input position indicator 1530, and one or more coupling holes 1537 are formed inside the hollow hole to fix the input mediating unit 1300.

Accordingly, an entrance hole 1517 in communication with the hollow hole may be further provided in the housing 1510 so that a fixing member is inserted.

Meanwhile, the input feedback unit 1500 may include any one of the methods of the output feedback unit 1200 illustrated in FIGS. 5 and 6, and accordingly, a specific description thereof will be omitted.

Figure 11:
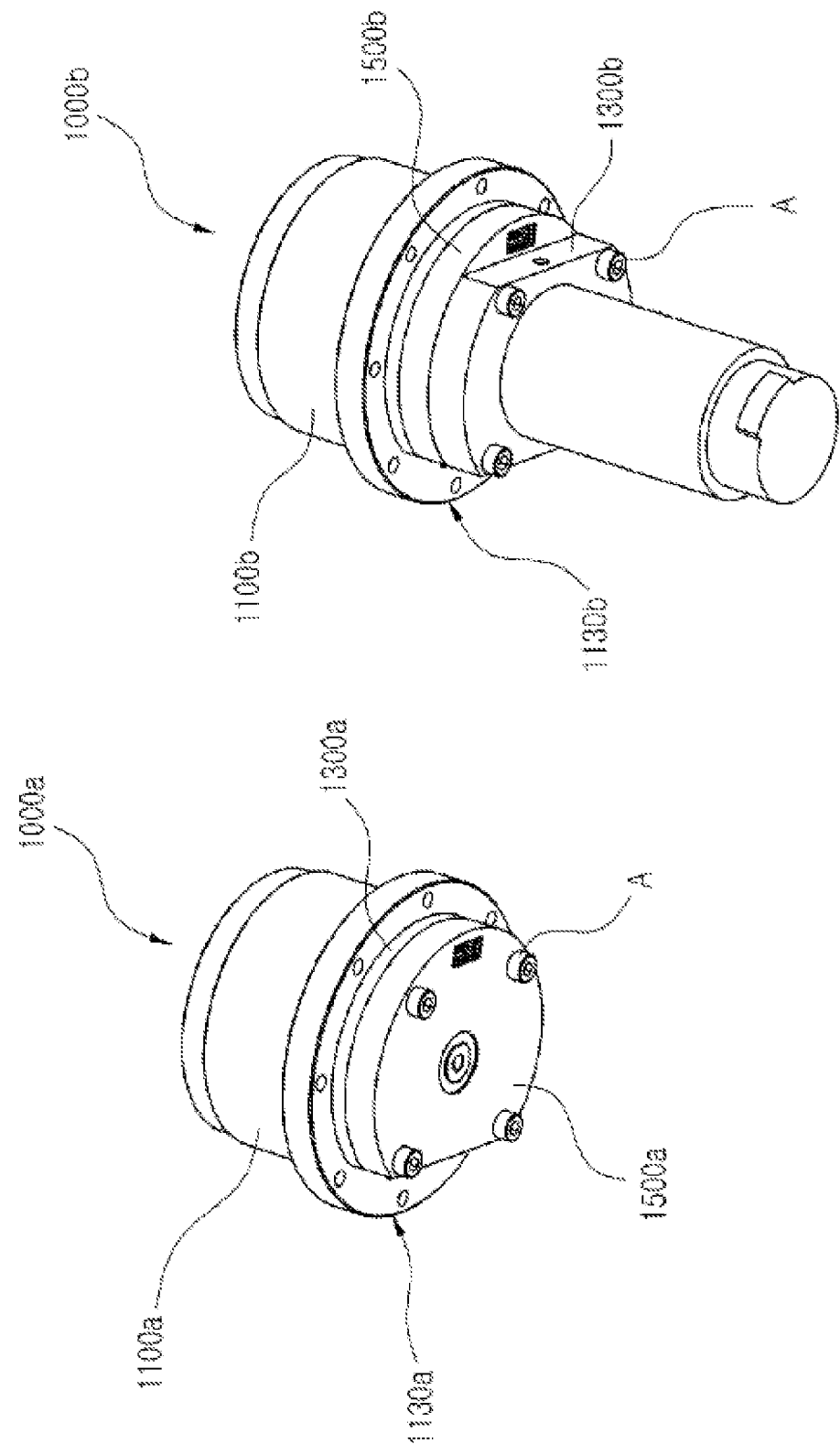
FIG. 11 is a view illustrating a multi-input reduction gear according to a second embodiment of the present invention.
Figure 12:
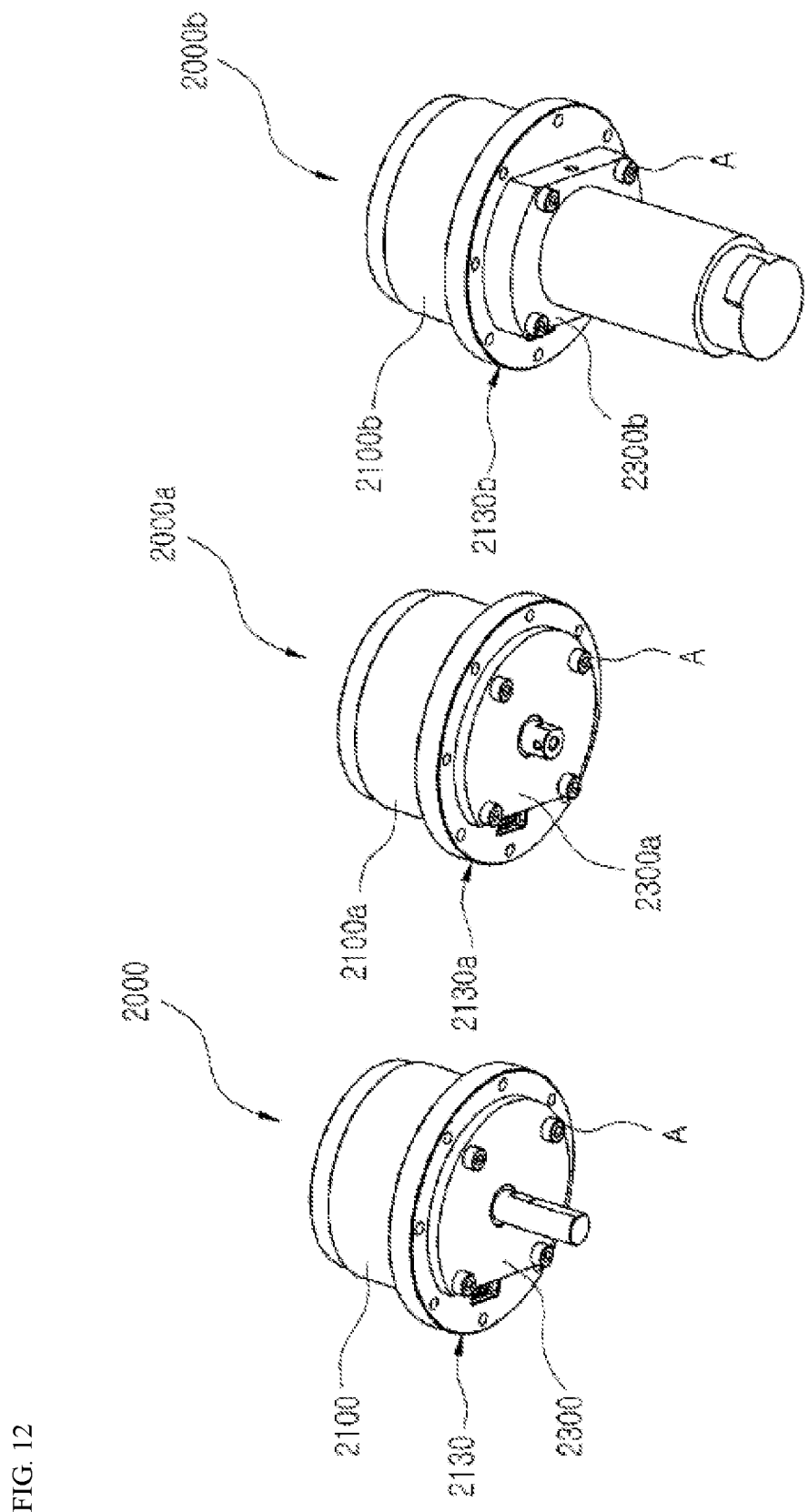
FIG. 12 is a view illustrating a multi-input reduction gear according to a third embodiment of the present invention.

FIG. 11 is a view illustrating a multi-input reduction gear according to a second embodiment of the present invention, FIG. 12 is a view illustrating a multi-input reduction gear according to a third embodiment of the present invention, and the embodiments will be described with reference to the drawings.

As illustrated in FIG. 11, input mediating units 1300a and 1300b may be provided in various types, for example, any one type of a coupling hole and a gear.

As illustrated in FIG. 11A, the coupling hole type may include an adaptor body (not shown), a coupling hole type shaft (not shown), a transmission gear (not shown), and one or multiple bearings (not shown), and be stacked on and coupled to the input unit 1130a of the reduction gear body 1100a.

Here, an insertion hole for a unit to be coupled into which the unit to be coupled is inserted is formed in a coupling hole type shaft in a direction of a driving shaft, and fastening holes (taps), for example one or more thereof, for the unit to be coupled may be installed in a direction perpendicular to the shaft.

In addition, as illustrated in FIG. 11B, the gear coupling type may include an adaptor body (not shown) and a transmission gear (not shown).

Here, an entrance hole may be formed in the adaptor body for inserting a tool, an insertion hole for a unit to be coupled into which the unit to be coupled is inserted may be formed in the transmission gear in a direction of a driving shaft, and fastening holes (taps), for example, one or more thereof, for the unit to be coupled may be installed in a direction perpendicular to the shaft.

In addition, the gear coupling type may be connected to the above-described shaft type, the coupling hole type, or the like after excluding the transmission gear and may be implemented to directly connect the motor and the reduction gear unit when a motor whose protruding shaft rotates is used as a power source of the reduction gear unit.

In addition, the gear coupling type may be provided to have a coupling structure in a stack type in which the input feedback unit 1500b is first coupled to the input unit 1130b of the reduction gear body 1000b and finally coupled to one side of the input feedback unit 1500b.

Meanwhile, as illustrated in FIG. 12, input mediating units 2300, 2300a, and 2300b having a shaft type, a coupling hole type, and a gear coupling type are stack-coupled to each other without an input feedback unit 1500 according to the embodiment, and then multi-input reduction gears 2000, 2000a, and 2000b may be implemented to receive sources of power of various strengths and transmit the converted outputs.

As a result, according to above-described FIGS. 3 to 12, since the output feedback unit 1200, the input feedback unit 1500, and the input mediating units 1300, 1300a, 1300b, 2300, 2300a, and 2300b provided in the multi-input reduction gears 1000, 1000a, 1000b, 2000, 2000a, and 2000b are detachable, the input method for implementing an automatic device is easy, and because of the realization of the stack type coupling structure, a plurality of mechanical components may be selectively adopted.

In addition, since positions of the input units 1130, 1130a, 1130b, 2130, 2130a, and 2130b and the output unit 1150 are fed back by the output feedback unit 1200 and the input feedback unit 1500 provided in the multi-input reduction gears 1000, 1000a, 1000b, 2000, 2000a, and 2000b having coupling structures in a detachable type, an effect in which a more elaborate and precise control can be performed can be achieved.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications or alterations derived from meanings, the scope and equivalents of the appended claims.

The invention claimed is:

1. A multi-input reduction gear having an input/output position feedback, comprising:
    a reduction gear body including an input unit and an output unit;
    an output feedback unit which is detachably provided in the reduction gear body and detects a position of the output unit;
    an input mediating unit which is detachably provided in the reduction gear body, is connected to a shaft of a power source, and transmits power to the input unit; and
    an input feedback unit which is stacked between and coupled to the reduction gear body and the input mediating unit and detects a position of the input unit,
    wherein:
    a mounting groove is provided in the reduction gear body in a direction toward an inside of the input unit such that the output feedback unit is detachable; and
    an output feedback unit coupling hole formed in the mounting groove and an input feedback unit coupling hole formed around the mounting groove are provided in the input unit.

2. The multi-input reduction gear of claim 1, wherein the output feedback unit is embedded in the input unit to be integrated with the reduction gear body.

3. The multi-input reduction gear of claim 1, wherein the output feedback unit includes:
    a body;
    an output position indicator which transmits a rotation angle to the output unit; and
    an output position detector which detects a position and displacement of the output position indicator.

4. The multi-input reduction gear of claim 1, wherein any one of magnetic, potentiometer, and optical incremental encoder methods is used for detection of the output feedback unit.

5. The multi-input reduction gear of claim 4, wherein any one of the methods of the output feedback unit of claim 4 is used for detection of the input feedback unit.

6. The multi-input reduction gear of claim 1, wherein the input mediating unit is provided in any one type of a shaft, a coupling hole, and a gear.

7. The multi-input reduction gear of claim 1, wherein the input feedback unit includes:
   a frame in which a through hole is formed;
   an input position indicator which is inserted into the through hole and transmits a rotation angle to the input unit; and
   an input position detector which detects a position and displacement of the input position indicator,
   wherein the input position indicator is provided with a hollow hole to be coupled to the input mediating unit, and one or more coupling holes are formed inside the hollow hole to fix the input mediating unit.

8. The multi-input reduction gear of claim 7, wherein the frame further includes an entrance hole which communicates with the hollow hole such that a fixing member is inserted.

9. The multi-input reduction gear of claim 1, wherein a cycloid type speed reduction unit is provided between the input unit and the output unit.

* * * * *